Patented Apr. 2, 1940

2,195,870

UNITED STATES PATENT OFFICE 2,195,870

RECOVERY OF SULPHUR

Raphael Rosen, Elizabeth, N. J., assignor to Standard Oil Development Company, a corporation of Delaware No Drawing. Application June 4, 1937, Serial No. 146,368

1 Claim. (Cl. 23—228)

This invention relates to an improved process for the removal and recovery of free sulphur. It particularly relates to the removal and recovery of free sulphur from mechanical mixtures by means of contacting said mixtures with a sulphur solvent derived from petroleum.

The process employs as sulphur solvents, hydrocarbon fractions obtained by extracting a petroleum oil, preferably a petroleum oil derived from aromatic type crudes with solvents having a preferential solubility for compounds with a lower ratio by weight of hydrogen to carbon as compared to compounds having a higher ratio by weight of hydrogen to carbon as, for example, a solubility preference for aromatic type compounds as compared to aliphatic type compounds.

Sulphur solvents secured in this manner may be used as such or may be further purified or distilled to secure particularly optimum fractions having a more desirable solubility curve for sulphur versus temperature change, or fractions dissolving a greater quantity of sulphur at a particular temperature or to secure a sulphur solvent having a particular boiling range.

Any petroleum oil may be extracted to secure the solvents as described above. However, the preferred sources are petroleum oil fractions boiling within the range from about 100° to 700° F., preferably within the range of about 350° to 600° F. as, for instance, fractions distilling in the range of varsol and kerosene. These cuts to be extracted are preferably secured from crudes containing greater quantities of aromatic and naphthene compounds as, for example, cuts from crudes such as Conroe, Deep Sand Raccoon, Shallow Sand Raccoon, Tomball or similar crudes.

Fractions from crude sources other than the above may be extracted with solvents having a solubility preference for aromatic type of compounds as compared to aliphatic type compounds.

Any solvent capable of selectively dissolving compounds having a lower ratio by weight of hydrogen to carbon is satisfactory. Some suitable solvents of this class are, for example, liquid sulphur dioxide, phenol, ortho anisidine, ethylene diacetate, triphenyl phosphate, acetonitrile, furfural, resorcinol, diacetate, tricresyl phosphate, aniline, acetone and the like. These solvents or other similar solvents may be used individually or as mixtures to secure optimum results. The extraction process may be carried out in batch, multiple batch, or by the counter current method. Variables such as temperature, method of contacting, and ratio of solvent to oil may be widely adjusted to secure a satisfactory extract.

When using sulphur dioxide as the extracting agent it is preferred to use about 1 to 3 volumes of sulphur dioxide to 1 volume of the stock to be extracted and to treat at a temperature of from about —30° F. to —80° F. The sulphur dioxide is usually added and the solution chilled to below —30° F. by indirect or by direct means of cooling. Brine or ammonia solutions may be circulated in pipes or an added volatile material may be evaporated as, for instance, liquid propane or even sulphur dioxide itself may be evaporated. A combination of direct and indirect cooling may also be employed. The chilled mixture is thoroughly agitated and then allowed to stand at a temperature of below —30° F. until it separates into distinct layers which are readily separable. The sulphur dioxide layer containing the extract is removed from the raffinate and the sulphur dioxide separated from the extract by any suitable means such as by evaporation or by steam stripping. The above process may also be carried out by any suitable continuous method rather than the batch method as described.

Extracts secured in the above manner may be used as such or may be further purified or distilled to secure a more desirable solvent fraction.

Desirable solvents prepared in this manner have gravities in the range from zero to 30° A. P. I. and aniline points varying from about 20° F. to —80° F. It is preferred to have solvents having aniline points of below —20° F.

One way of preparing an effective desirable solvent is as follows:

A petroleum oil boiling in the range from about 300° F. to 550° F. and derived from an aromatic type crude was extracted with liquid sulphur dioxide at a temperature below —30° F. The extract was removed from the liquid sulphur dioxide and had the following specifications:

| | |
|---|---|
| Gravity, °A. P. I. | 21.8 |
| Aniline point, °F | —24 |
| Initial, °F | 313 |
| 5 per cent | 339 |
| 10 per cent | 347 |
| 50 per cent | 419 |
| 90 per cent | 501 |
| 95 per cent | 525 |
| Final, °F | 551 |
| Recovery per cent | 98 |

This solvent was then tested for sulphur solubility with the following results:

| Temperature, °F. | Grams of sulphur dissolved per 100 cc. of solvent |
|---|---|
| 204 | 16.43 |
| 78 | 2.78 |

Thus this data shows the extreme desirability of this type of sulphur solvent. At a temperature readily obtained as, for instance by heating with steam, the solvent will dissolve approximately 18% its own weight in sulphur. By allowing the solvent to cool 126° without the necessity of using external cooling medium, it will precipitate out approximately 83% of the dissolved sulphur.

Thus the heat necessary to be added and withdrawn is a minimum. The extremes of the operating temperature range is at room and steam temperatures, which is practically ideal for efficient economical operation. Furthermore, the quantity of sulphur dissolved per cycle is extremely high in that the solvent dissolves about 18% of its own weight.

One particular desirable application of the applicant's invention is the removal of free sulphur from metallic oxides employed in purifiers for the removal of sulphur dioxide compounds from industrial lighting and heating gases. These gases may be secured by the distilling of coal and in the manufacture of coke. Gases secured in this manner contain sulphur hydrogen compounds which are removed by passing through purifiers containing metallic oxides which are usually some form of ferric oxides. The reaction is rather complicated but the final products are iron sulphur compounds and free sulphur. When the oxide has become saturated, it is usually removed from the purifiers and exposed to air where, coming into contact with the atmosphere, the ferric oxide is revivified and the sulphur freed.

It is highly desirable to prevent any clogging of the purifier by the free sulphur before the metallic oxide is completely saturated. It is therefore desirable to remove the free sulphur as completely as possible in the most efficient and economic manner. Since the oxide is extremely sensitive to local over heating which will destroy it, the solvent of the applicant is very desirable for removing the free sulphur from the reaction zone.

The solvent of the applicant is very applicable to a process of revivifying the metallic oxide without removing the same from the purifiers by passing gas or an air mixture containing at first a small percentage of free oxygen through the metallic mass, thereby freeing the sulphur. The heat evolved in the revivification process may be removed by cooling with water, but is preferably removed by means of the applicant's solvent which will dissolve and remove the free sulphur. In this manner the ferric oxide is revivified and the sulphur efficiently removed in an economic manner from the purifiers.

This invention is directed primarily to extracting free sulphur from the mechanical mixtures containing the same. It is, however, not to be limited in any manner to a particular type of process or to be limited by any theory of operation, but only by the following claim in which it is desired to claim all novelty in so far as the prior art permits.

I claim:

Process for the removal and recovery of free sulphur comprising contacting a solid mixture containing free sulphur and insoluble inorganic substances with a solvent at about 204° F. and under substantially atmospheric pressure, followed by removal and cooling of the solvent to about 78° F. to precipitate the sulphur, said solvent having an aniline point of about —24° F. and a gravity of about 21.8° A. P. I. and boiling in the range from substantially 313° to substantially 551° F., said solvent being secured by extracting a petroleum oil fraction, which boils in the range from substantially 300° to 550° F., with liquid sulphur dioxide at a temperature below —30° F., said petroleum oil fraction having been derived from an aromatic type crude oil.

RAPHAEL ROSEN.